United States Patent [19]

Swatek

[11] Patent Number: 5,301,427
[45] Date of Patent: Apr. 12, 1994

[54] HANDHELD PIPE RULE AND CUTTER

[76] Inventor: Elizabeth A. Swatek, 214 Pecks Ct., Walworth, Wis. 53184

[21] Appl. No.: 64,770

[22] Filed: May 19, 1993

[51] Int. Cl.5 .................................................. B23D 21/08
[52] U.S. Cl. ........................................ 30/101; 30/92; 33/773
[58] Field of Search ............... 30/101, 95, 92.5, 92, 30/93, 94; 33/772, 773, 775, 778

[56] References Cited

U.S. PATENT DOCUMENTS

| 76,729 | 4/1868 | DeGalleford et al. | 30/94 |
|---|---|---|---|
| 1,811,046 | 6/1981 | Goldhagen | 30/101 |
| 2,517,355 | 8/1950 | Runnells | 30/93 |
| 3,049,956 | 8/1962 | Lynch, Sr. | 83/467 |
| 4,205,447 | 6/1980 | Smith | 33/134 R |
| 4,457,071 | 7/1984 | Alphonso | 33/778 |
| 4,481,714 | 11/1984 | Nelson | 33/772 |
| 4,831,732 | 5/1989 | Garton | 30/101 |
| 5,033,153 | 7/1991 | Post | 30/102 |
| 5,033,344 | 7/1991 | Ohnedea et al. | 83/262 |

Primary Examiner—Richard K. Seidel
Assistant Examiner—Kenneth E. Peterson
Attorney, Agent, or Firm—Lathrop & Clark

[57] ABSTRACT

A rigid housing has an axially extending opening which receives a length of cylindrical tubing therethrough. A measuring assembly is mounted to the housing and has a circular friction wheel which is rotatable about an axis which is perpendicular to the axis of the tubing. The friction wheel extends into the opening into engagement with the tubing, such that as the tubing is advanced through the housing, the wheel is turned. An encoder wheel is fixed to the friction wheel to allow a photodetector to determine the angular displacement of the wheel. An electric controller receives signals from the photodetector and calculates the linear length of tubing which has passed beneath the wheel and displays this on a liquid crystal display. A cutting assembly is mounted to the housing and spaced axially from the measuring assembly. The cutting assembly has a cutting blade which is rotatable about an axis substantially perpendicular to the friction wheel axis. The cutting assembly is vertically adjustable to be clear of the pipe as it is advanced through the housing, and to be brought into cutting contact when the desired length of tubing is shown on the display. Spring loaded wedges are adjustable to securely position tubing of different diameters.

8 Claims, 3 Drawing Sheets

HANDHELD PIPE RULE AND CUTTER

FIELD OF THE INVENTION

The present invention relates generally to devices for cutting objects to predetermined lengths and in particular to devices for obtaining segments of tubing of a desired size.

BACKGROUND OF THE INVENTION

Thin-walled pipe formed of copper, steel, plastic, or other material, is used extensively in plumbing, heating and ventilating, electrical installations, and other construction trades. Although occasionally flexible, most cylindrical piping is generally rigid and must be cut to size to conform to the geometry of the building structure or installed apparatus with which it is to be employed.

Although fine tolerances are usually not required, pipe must be cut with some accuracy to ensure acceptable joints and performance.

Typically, the desired length of pipe is obtained by measuring with a tape measure or ruled line a predetermined distance from the cut end of a pipe stock, marking the desired length with a grease pencil or blade, positioning a pipe cutter with radially adjustable cutting edge about the pipe, adjusting the cutting edge to bear on the pipe wall and rotating the pipe cutter to traverse the periphery to the tube to cut off a segment of pipe.

Pipe cutters are known which employ rigid fixtures or attached ruling bars to allow pipes to be cut to a preset length. However, these devices are cumbersome and are not suited for portable use.

What is needed is an apparatus which is conveniently portable and which may be conveniently utilized by a tradesman to both measure a length of pipe and cut it to a desired length.

SUMMARY OF THE INVENTION

The handheld pipe rule and cutter of the present invent has a rigid housing with an axially extending opening which receives a length of cylindrical tubing therethrough. A measuring assembly is mounted to the housing and has a circular friction wheel which is rotatable about an axis which is perpendicular to the axis of the tubing. The friction wheel extends into the opening into engagement with the tubing, such that as the tubing is advanced through the housing, the wheel is turned. The wheel is rotatable such that the angular displacement of the wheel is proportional to the linear length of tubing inserted into the housing opening. An encoder wheel is fixed to the friction wheel to allow a photodetector to determine the angular displacement of the wheel. A cutting assembly is mounted to the housing and spaced axially from the measuring assembly. The cutting assembly has a cutting blade which is rotatable about an axis substantially perpendicular to the friction wheel axis. The cutting assembly is vertically adjustable to be clear of the pipe as it is advanced through the housing, and to be brought into cutting contact when the desired length of tubing is shown on the display. An electric controller receives signals from the photodetector and calculates the linear length of tubing which has passed beneath the cutter wheel and displays this on a liquid crystal display. Spring loaded wedges are adjustable to securely position tubing of different diameters. The housing may be rotated with respect to the tubing received within the opening to cut the tubing to a selected length.

It is an object of the present invention to provide an apparatus for cutting a desired length of tubing from a quantity of tubing stock.

It is also an object of the present invention to provide a handheld apparatus which conveniently measures a desired distance from the end of a length of tube and cuts the tube at that position.

It is a further object of the present invention to provide a pipe cutter with visual display of pipe length to be cut.

It is an additional object of the present invention to provide an apparatus for cutting tubing to a selected length which need not be fixed to or supported on a support surface in operation.

Further objects, features and advantages of the invention will be apparent from the following detailed description when taken in conjunction with the accompanying drawing.

DESCRIPTION OF THE PREFERRED EMBODIMENT

Figure 1:
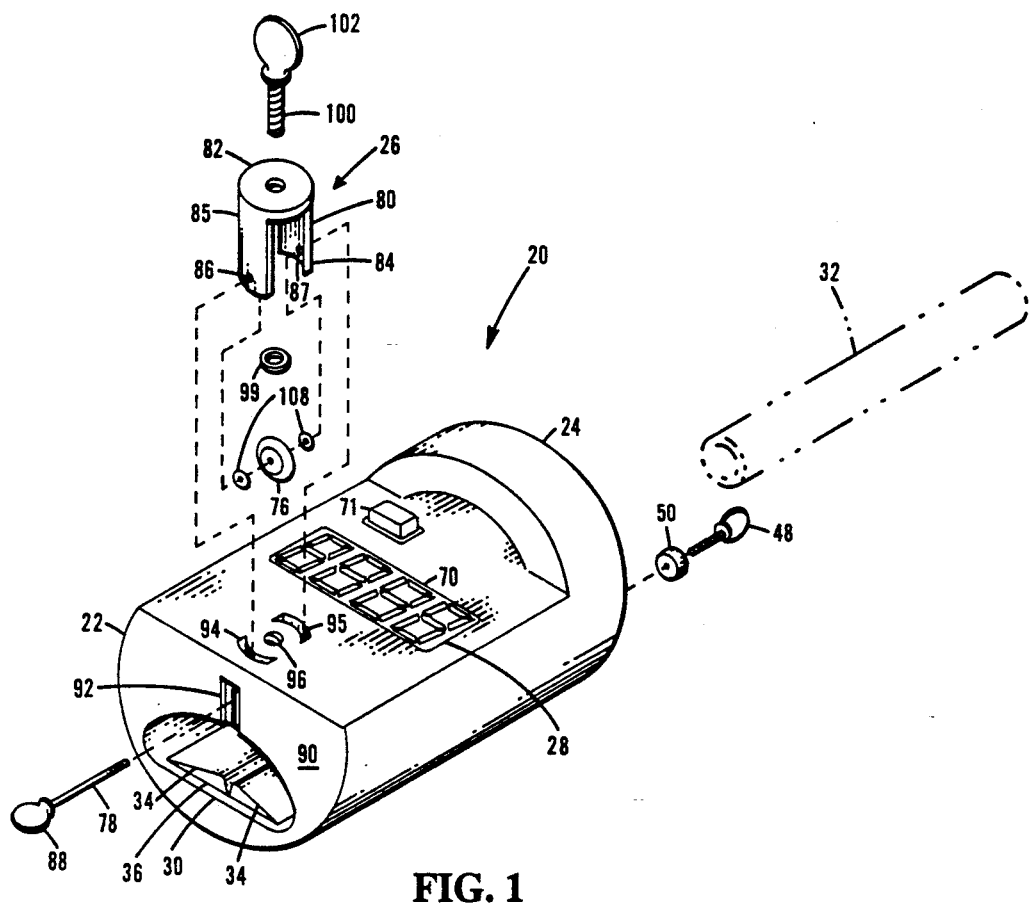
FIG. 1 is an exploded isometric view of the pipe cutting and measuring apparatus of the present invention.

Referring more particularly to FIGS. 1-5, wherein like numbers refer to similar parts, a measuring and cutting apparatus 20 is shown in FIG. 1. The apparatus has a rigid housing 22 which may be molded of plastic but which is preferably die cast metal. The housing has an integral handle 24 and accommodates a pipe cutter assembly 26 and an axial length measuring assembly 28. The handle 24 extends from the housing and provides a leveraged gripping location for hand manipulation of the apparatus with respect to a length of tubing. The housing 22 has a tube opening 30 which extends axially through the housing 22 and which receives the length of pipe 32 to be measured and cut.

The size of the housing 22 will depend upon the size pipe which it is desired to cut, although it is desirable that the housing be small enough to be conveniently portable and light-weight and yet large enough for accurate hand manipulation. An exemplary housing 22 adapted for pipe sizes up to two inches in diameter would be approximately 6 inches tall and 8 inches long. For purposes of this application, the words tubing and pipe are used interchangeably.

Figure 4:
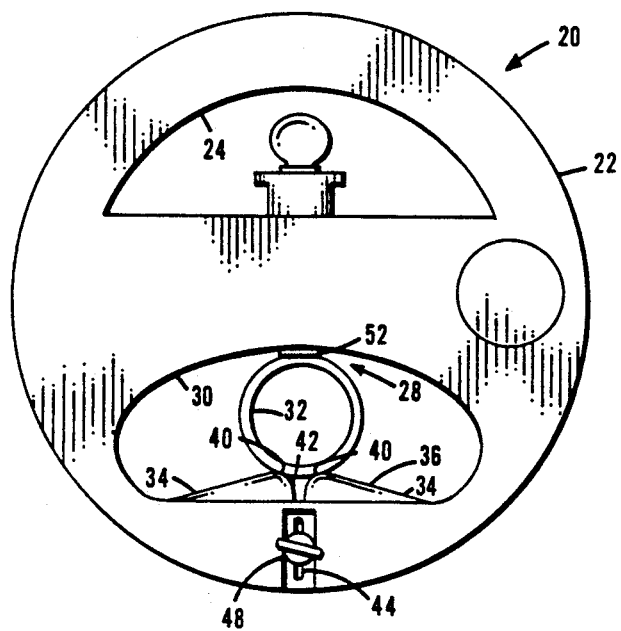
FIG. 4 is a real elevational view of the apparatus of FIG. 1.

The tube opening 30, as best shown in FIG. 4, is generally semi-circular and extends the length of the housing 22 to permit a tube 32 to be inserted therethrough. As the tubing operated on by the apparatus 20 will not all be of the same diameter, a mechanism is provided for adjustably supporting the tubing within the opening 30. Two spring-loaded support wedges 34 are pivotably connected to the housing to extend into the tube opening 30. The wedges 34 are preferably formed of die cast aluminum and are rigid members, approximately triangular in cross section, which have radiused ends 36 which facilitate insertion of a tube 32 into the tube opening 30. A torsion spring 38, shown in FIG. 5, extends between each wedge 34 and the housing 22 so as to maintain the wedges 34 fully extended into the opening when the spring is relaxed. The wedges 34 have upwardly and inwardly facing radiused corners 40 which together form a groove 42 which is parallel with the center of the housing 22 the groove serves to position an inserted tube 32 with respect to the measuring assembly 28 and cutter assembly 26. A vertically extending slot 44 is located on the entry face 46 of the housing 22 beneath the tube opening 30. A thumbscrew 48 extends through the slot 44 and beneath the wedges 34. A stiff rubber grommet 50 is threaded on the screw 48 and may be vertically adjusted by movement of the screw 48 to retain the wedges 34 at a desired height.

The measuring assembly 28 comprises a freely rotating friction wheel 52 which is mounted to the housing on an axis perpendicular to the axis of the tube 32 and a means for detecting and displaying the angular displacement of the wheel in terms of the linear measurement of the wheel perimeter moved thereby. The angular displacement of the wheel 52 is thus proportional to the linear length of tubing inserted into the housing.

Figure 2:
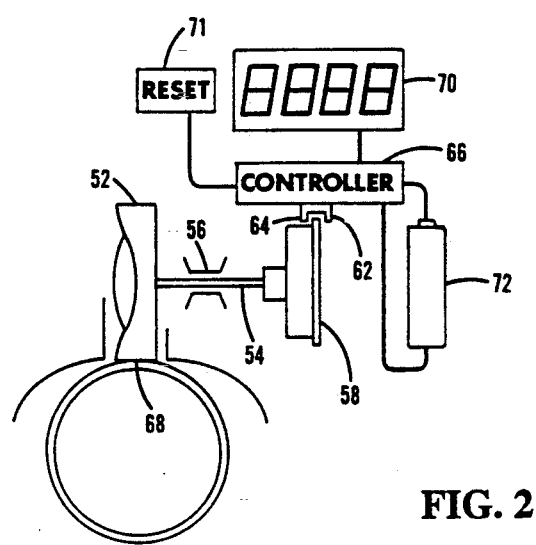
FIG. 2 is a schematic view of the pipe measuring mechanism of the apparatus of FIG. 1.

The friction wheel 52, shown schematically in FIG. 2, is approximately one inch in diameter and is formed from a stiff rubber or semi-resilient plastic, or other material which is adapted to make non-slipping engagement with the exterior surface of the tube 32. The friction wheel is mounted to the housing 22 directly above the groove 42 formed by the wedges 34 to engage with the tube 32 which is inserted in the opening 30. The engagement between the tube and the friction wheel 52 is such as to substantially avoid slippage between the tube and the wheel and yet one which does not significantly compress the diameter of the wheel. The wheel 52 is rigidly connected to an axle 54 which extends through a low friction bearing 56 mounted to the housing 22. Means for measuring the angular displacement of the friction wheel 52 is provided by a photosensor and encoder. A conventional optical encoder wheel 58 is rigidly connected to the axle 54 on the other side of the bearing 56 from the wheel 52. The encoder wheel is preferably of the type having a plurality of radially extending slots 60 which extend in front of a photoreceptor or detector 62 to receive light from a light emitting diode 64 placed on the opposite side of the wheel 58.

An electronic controller 66 is electrically connected to the photoreceptor 62 and operates to count the number of slots which pass in front of the photoreceptor and correlate that information with preset parameters relating to the diameter of the friction wheel and the offset between the line of contact 68 of the friction wheel with the pipe and the line of contact of the pipe cutter assembly 26 with the pipe. The controller thus computes the linear length of tubing to be cut which corresponds to the angular displacement of the friction wheel. The controller will preferably comprise a conventional micro processor. The controller 66 is connected to an electronic display 70 which is preferably a digital liquid crystal display but which may alternatively be a light emitting diode, an electroluminescent display, or other conventional display means. The controller 66 and encoder wheel 58 are configured to be sensitive to the direction of rotation of the encoder wheel 58 so that the display 70 will show values which increase as a greater length of pipe is inserted into the entry face 46 of the housing and which will decrease as the pipe is retracted. Alternatively an electromagnetic encoder may be used with the controller.

Figure 5:
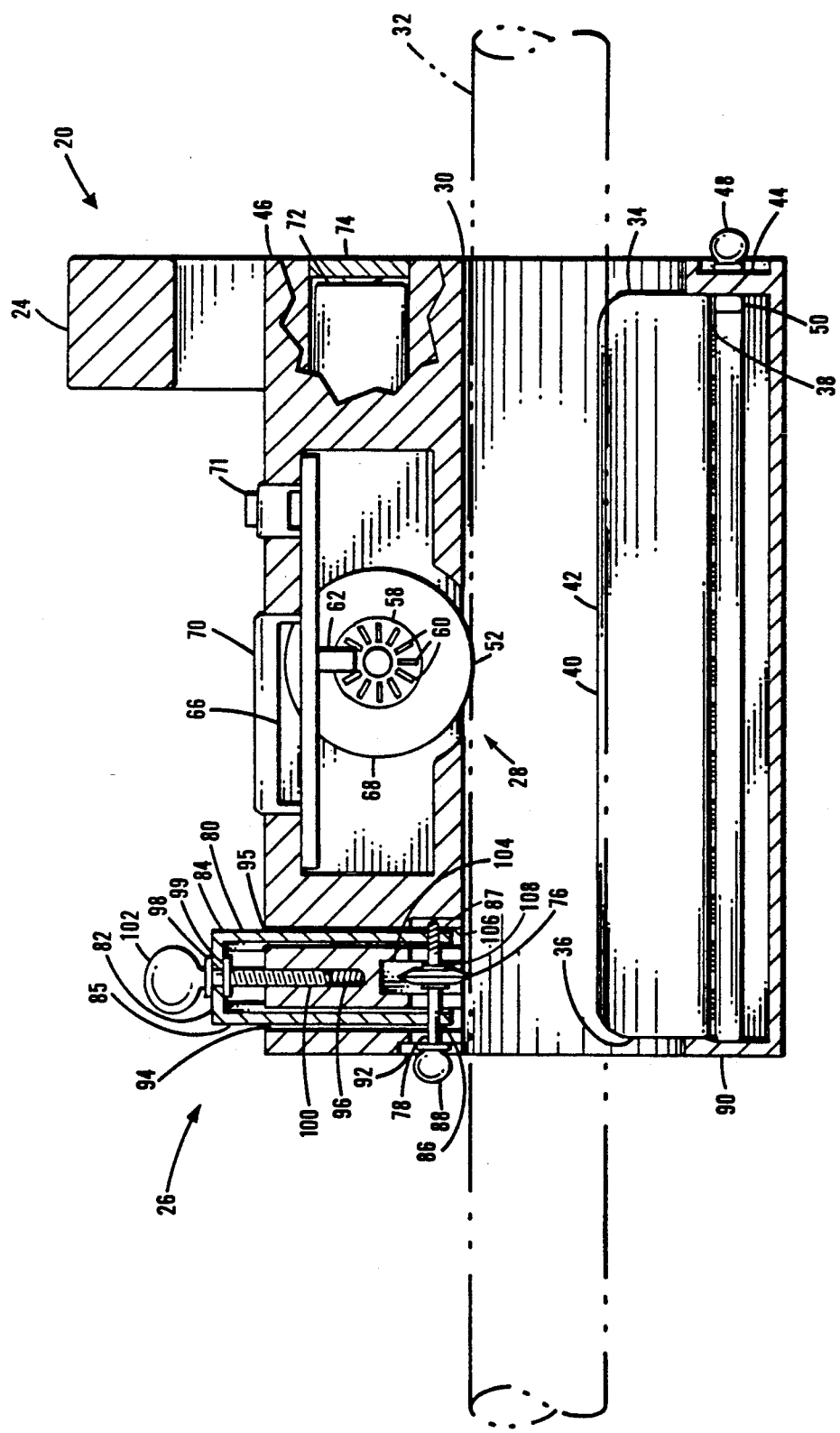
FIG. 5 is a cross-sectional view taken along section line 5—5 of the apparatus of FIG. 3.

A conventional battery 72, shown in FIG. 5, is located behind a battery door 74 located on the entry face 46 of the housing and shown in FIG. 4. The battery 72 supplies power to the electronic components of the measuring assembly 28.

The pipe cutter assembly 26 is connected to the housing 22 behind the friction wheel 52 and above the tube opening 30.

Figure 3:
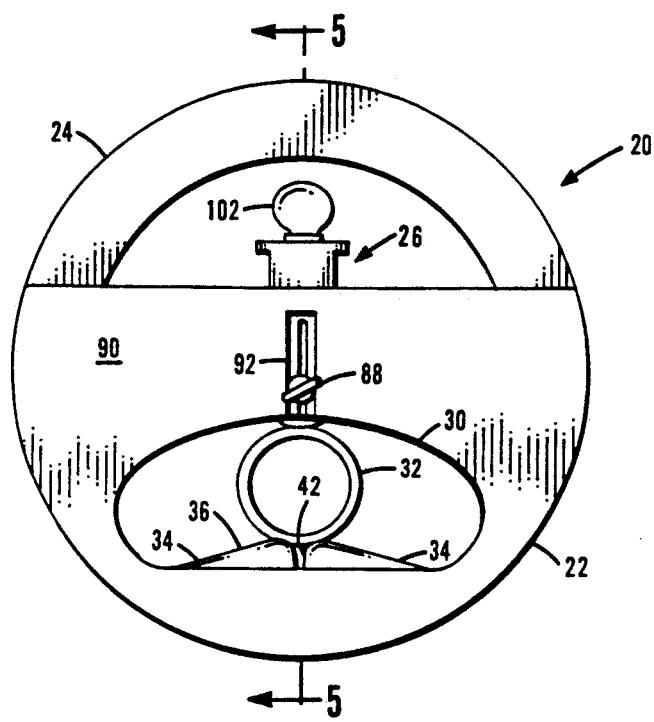
FIG. 3 is a front elevational view of the apparatus of FIG. 1.

The cutter assembly 26 comprises a sharpened cutter wheel 76 which rotates freely on a vertically adjustable screw rod 78 which is connected to a cutter frame 80, best shown in FIGS. 1 and 5. The cutter wheel 76 is of conventional manufacture, and will typically be formed of steel with a peripheral cutting edge. The frame 80 has a horizontal collar 82 and two downwardly extending legs 84, 85. The outwardly facing leg 85 has a through hole 86 through which the screw rod 78 extends. The inner leg 84 has a threaded hole 87 into which the threaded screw rod 78 is engaged. The screw rod 78 extends beyond the outlet face 90 of the housing 22 above the tube opening 30 and has a head 88 which is graspable and rotatable by finger pressure. As shown in FIGS. 1 and 3, the screw rod is movable vertically in a outlet face slot 92 to accommodate the vertical position of the cutter wheel 76.

The cutter frame legs 84, 85 extend into slots 94, 95 formed in the housing. The cutter frame collar 82 extends between the legs 84, 85 and is positioned above a threaded hole 96 which opens upwardly in the housing 22. The collar 82 is captured between the ridge 98 and a protruding press-fit washer 99 located above the threads 100 of a cutter wheel vertical adjustment thumbscrew 102.

The cutter wheel 76 is mounted on the screw rod 78 within the cutter wheel cavity 104 and spaced from the walls 106 of the cutter wheel cavity 104 by two washers 108. Operation of the thumbscrew 102 will serve to raise and lower the cutter wheel 76 to bring it into contact with the tube 32 for cutting.

When it is desired to cut a length of tubing, the operator first actuates the reset button 71 to clear the display and activate the controller 66. A length of tube 32 is then inserted into the tube opening 30 at the entry face 46 of the housing 22 into engagement with the friction wheel 52. At this point the cutter wheel 76 is retracted within the cutter wheel cavity 104 so as not to interfere with the insertion of the tube 32. Next the wedge support thumbscrew 48 is adjusted to position the support wedges 34 at an appropriate level for the diameter tube to be operated on.

The tube 32 is then advanced beneath the friction wheel 52 causing the wheel to rotate and enabling the controller to read out the length of tubing which has passed beneath the friction wheel and by a simple arithmetical calculation the length of tubing which has passed beneath the cutter wheel 76. When the display 70 indicates the desired length of tube, the cutter wheel adjustment thumbscrew 102 may be adjusted to drive the cutter wheel into engagement with the tube 32. When the cutter wheel is at the proper height, the screw rod 78 is adjusted to fix the axis of cutter wheel rotation by engaging against the housing 22 adjacent the cutter frame inner leg 84. With the cutter wheel axis fixed the operator grips the handle 24 of the apparatus 20 and rotates it to move the cutter wheel circumferentially about the tube 32. The thumbscrew is progressively tightened until the tube is completely severed, yielding a tubing segment of the desired length.

A desired length of tubing having been cut, the process may be repeated to cut additional segments. It should be noted that the pipe cutter assembly which employs a cutter wheel mounted on an axis parallel to the axis of the tube to be cut, may employ alternative equivalent mechanisms for advancing and retracting the cutter wheel. For example, a system of linkages, or gears may equivalently be utilized.

It is understood that the invention is not confined to the particular construction and arrangement of parts herein illustrated and described, but embraces such modified forms thereof as come within the scope of the following claims.

I claim:
1. A handheld apparatus for cutting tubing to a selected length, comprising:
   (a) a housing having an opening for receiving tubing which extends axially through the housing;
   (b) a measuring assembly mounted to the housing, the measuring assembly having a rotatable wheel which rotates about an axis perpendicular to the tubing received within the opening, the wheel being rotatable such that an angular displacement of the wheel is proportional to a linear length of tubing inserted into the housing;
   (c) a cutter assembly mounted to the housing, the cutter assembly having a rotatable cutter blade which rotates about an axis substantially perpendicular to the measuring assembly wheel axis, such that the housing and the connected cutter blade may be rotated about tubing received within the opening to cut said tubing to a selected length;
   (d) means for measuring the angular displacement of the measuring assembly wheel;
   (e) an electronic controller which computes the linear length of tubing to be cut corresponding to said angular displacement; and
   (f) a display connected to the controller which displays the computed linear length.

2. The apparatus of claim 1 wherein the means for measuring the angular displacement of the measuring assembly wheel comprises a photoelectric detector mounted to the housing to detect the angular displacement of the measuring assembly wheel.

3. The apparatus of claim 1 further comprising two support wedges mounted to the housing and extending into the housing opening beneath the cutter assembly, the wedges being adjustable to selectively support a length of tubing of a determined diameter for measurement and cutting.

4. The apparatus of claim 1 further comprising a handle which extends from the housing and which provides a leveraged gripping location for hand manipulation of the apparatus with respect to a length of tubing.

5. A handheld apparatus for cutting tubing to a selected length comprising:
   (a) a housing having an axial opening through which tubing may be inserted;
   (b) a cutter wheel rotatable about a first axis and vertically adjustable with respect to the opening, such that the cutter wheel may be selectively brought into and out of cutting engagement with tubing which extends through the housing opening;
   (c) a measuring wheel which is rotatably mounted to the housing about an axis which is substantially perpendicular to the first axis, wherein the wheel extends into the housing opening to engage with tubing inserted therein;
   (d) a detector mounted to the housing to detect an angular displacement of the measuring wheel in response to advancing the tubing through the opening;
   (e) a controller connected to the detector to calculate a linear displacement of tubing which corresponds to the detected angular displacement of the measuring wheel; and
   (f) a display connected to the controller to display the length of tubing which has progressed through the opening beneath the cutter wheel, such that when the display shows the desired length of tubing, the cutter wheel may be engaged with the tubing to cut the tubing to length.

6. The apparatus of claim 5 further comprising an encoder wheel corotatively mounted to the measuring wheel, wherein the detector is a photoelectric device mounted to the housing to detect the angular displacement of the measuring wheel.

7. The apparatus of claim 5 further comprising two support wedges mounted to the housing and extending into the housing opening beneath the cutter wheel, the wedges being adjustable to selectively support a length of tubing of a determined diameter for measurement and cutting.

8. The apparatus of claim 5 further comprising a handle which extends from the housing and which provides a leveraged gripping location for hand manipulation of the apparatus with respect to a length of tubing.

* * * * *